(12) United States Patent
Wegkamp

(10) Patent No.: US 9,233,635 B2
(45) Date of Patent: Jan. 12, 2016

(54) MOBILE ACCOMMODATION ARRANGEMENT

(71) Applicant: Rene Wegkamp, Midrand (ZA)

(72) Inventor: Rene Wegkamp, Midrand (ZA)

(*) Notice: Subject to any disclaimer, the term of this patent is extended or adjusted under 35 U.S.C. 154(b) by 0 days.

(21) Appl. No.: 14/477,048

(22) Filed: Sep. 4, 2014

(65) Prior Publication Data

US 2015/0069781 A1    Mar. 12, 2015

Related U.S. Application Data

(60) Provisional application No. 61/874,499, filed on Sep. 6, 2013.

(51) Int. Cl.
*B60P 3/34*    (2006.01)

(52) U.S. Cl.
CPC ........................................ *B60P 3/34* (2013.01)

(58) Field of Classification Search
CPC ............................... B60P 3/34; B62D 63/061
USPC .................................. 52/64, 67; 296/156, 171
See application file for complete search history.

(56) References Cited

U.S. PATENT DOCUMENTS

| | | | | |
|---|---|---|---|---|
| 2,538,736 A | * | 1/1951 | Spencer et al. | 296/171 |
| 3,774,955 A | * | 11/1973 | Byer | 296/171 |
| 4,017,116 A | * | 4/1977 | Hulsey | 296/156 |
| 4,261,613 A | * | 4/1981 | Alford | 296/156 |
| 5,135,278 A | * | 8/1992 | Kauffman et al. | 296/170 |
| 5,154,469 A | * | 10/1992 | Morrow | 296/26.02 |
| 5,374,094 A | * | 12/1994 | Smith et al. | 296/26.05 |
| 6,302,475 B1 | * | 10/2001 | Anderson | 296/175 |
| 7,261,354 B1 | * | 8/2007 | Lozano | 296/26.05 |
| 8,720,126 B2 | * | 5/2014 | Strickland et al. | 52/79.5 |
| 8,826,601 B2 | * | 9/2014 | Gyory et al. | 52/79.5 |
| 2007/0182185 A1 | * | 8/2007 | Nichols | 296/26.08 |
| 2012/0151851 A1 | * | 6/2012 | Cantin et al. | 52/79.5 |
| 2012/0255240 A1 | * | 10/2012 | Shen | 52/79.5 |
| 2014/0360105 A1 | * | 12/2014 | Trout et al. | 52/79.5 |
| 2014/0361580 A1 | * | 12/2014 | Flynn | 296/180.3 |

* cited by examiner

*Primary Examiner* — Joshua J Michener
*Assistant Examiner* — Keith Minter
(74) *Attorney, Agent, or Firm* — The Webb Law Firm

(57) ABSTRACT

A mobile accommodation arrangement in the form of a bunkhouse trailer. The arrangement includes at least one lower living unit having a hollow interior, and an upper shell which fits over an outer periphery of the lower living unit and is telescopically displaceable relative to the lower living unit between a stowage position, in which the lower living unit nests inside the upper shell, and a deployed position, in which the upper shell is at least partially vertically spaced apart from the lower living unit and defines an upper living unit having a hollow interior, the floor of which is defined by a ceiling of the lower living unit. At least one partitioning member divides the hollow interior of the upper living unit into at least two separate volumes.

7 Claims, 4 Drawing Sheets

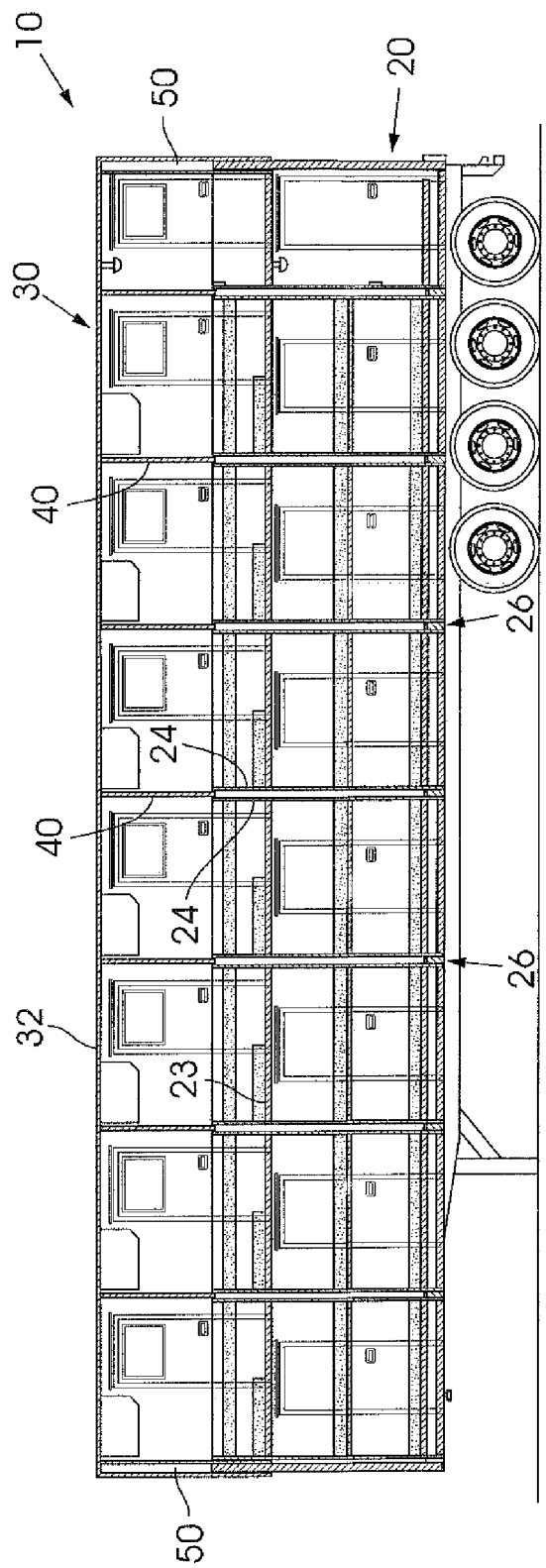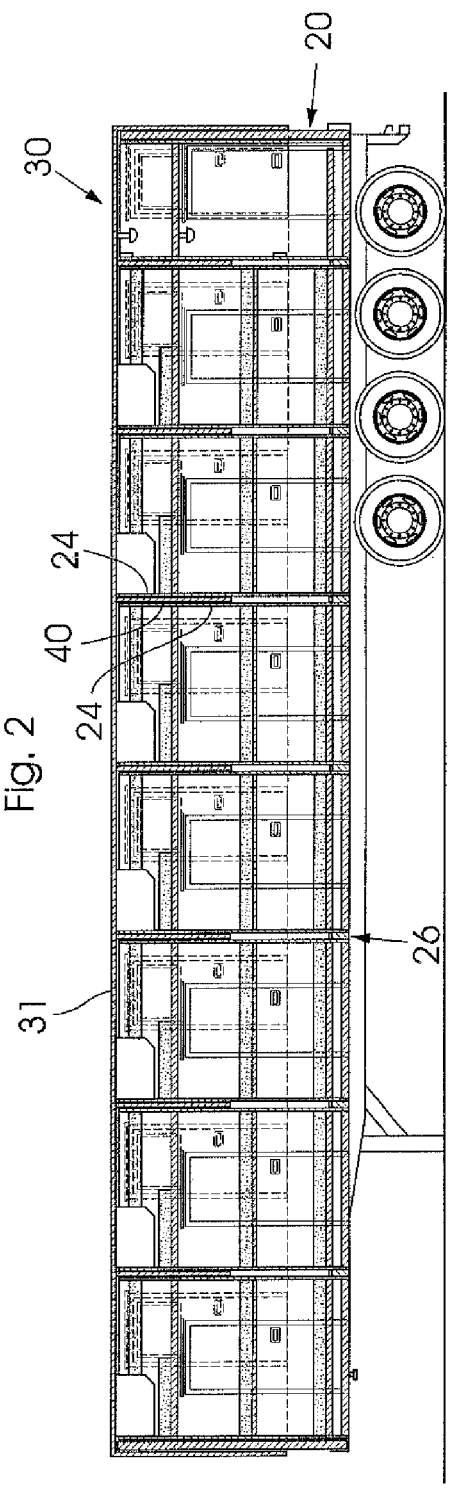

MOBILE ACCOMMODATION ARRANGEMENT

CROSS-REFERENCE TO RELATED APPLICATION

This application claims priority to U.S. Provisional Application No. 61/874,699 filed Sep. 6, 2013, the disclosure of which is hereby incorporated in its entirety by reference.

BACKGROUND OF THE INVENTION

1. Field of the Invention

This invention relates to a mobile accommodation arrangement, and more particularly but not exclusively, to a mobile accommodation arrangement in the form of a bunkhouse trailer.

2. Description of Related Art

Many businesses, such as traveling amusement parks, event companies and agricultural concerns, require temporary housing for staff and crew. It is important for the accommodation to be of a temporary nature because these businesses entail a substantial degree of relocation, and it would not make sense to provide for permanent accommodation.

A popular solution is to make use of trailer based accommodation, also referred to in the marketplace as bunkhouse trailers. These trailers essentially comprise a trailer with customized living quarters provided on the trailer chassis. The living quarters can be anything from rudimentary to very luxurious, depending on the intended purpose thereof. However, in the businesses referred to above the intention is to accommodate a large number of staff in a single bunkhouse trailer. In some cases the living quarters comprise a limited number of living units, with each living unit having more than one occupant. In more progressive environments, the intention is to have a plurality of single unit living quarters, which reduces the maximum number of occupants of a bunkhouse trailer.

There are many motivations for minimizing the number of bunkhouse trailers required to accommodate a fixed number of staff. A major concern is the operational expense associated with transporting the trailers. This includes truck rental, driver wages, fuel costs and licensing costs, to name but a few. The allotted space in parking lots are also limited, and it is at times difficult and expensive to accommodate a large fleet of bunkhouse trailers.

In the past there have been attempts at reducing the cost of bunkhouse trailers, for example by using cheaper materials, but this does not address the key issue of reducing the operational expenses, and simplifying logistics. In addition, there is only that much that can be done to reduce the cost of the trailers without relinquishing on minimum acceptable living conditions.

There have previously been attempts to reduce the required number of trailers by increasing the capacity of the bunkhouse trailers. However, reasonable living quarters must always remain an important consideration. In one example, it has been proposed to develop a vertically expandable bunkhouse trailer which has an upper level and a lower level. Due to the constraints in terms of allowable heights of vehicles travelling on public roads, the double storied trailers cannot remain in a double storey configuration permanently, and therefore has to be collapsible. This is not a problem in itself, and can readily be achieved by having an outer rectangular shell that is configured to nest onto, and is displaceable relative to, a mating lower compartment. The lower compartment can essentially constitute any living unit configuration that is already known in the art, because the upper and outer shell merely encapsulate the lower compartment when the trailer is converted to a stowage position. However, the upper living units will obviously have to be collapsible, which results in complications insofar as proper partitioning is concerned.

Trailers having vertically expandable living units are not common, and in the ones that are available the upper living space is in the form of an open plan living area. The obvious way to convert the upper living space into separate room would be to use temporary partitioning, which will have to be removable in order for the upper shell to be collapsible. This arrangement will however result in a number of disadvantages. Firstly, the quality of the partitioning is low due to the temporary nature thereof. Secondly, the installation and removal of the partitioning is a time consuming process, because they have to be installed separately after the upper shell have been expanded relative to the lower living units. Finally, there is always a risk of some of the partitioning members being forgotten or inadvertently left inside the upper living unit when the upper shell is collapsed onto the lower living units, thus resulting in substantial potential damage to the partitioning members, the upper shell and the shell displacement mechanism.

The shortcomings associated with existing upper level partitioning is significant, and double storey bunkhouse trailers have not been introduced into the market on a significant scale for this very reason. There are applications where the vertically expandable trailer concept is used in the recreational market, for example in high-end RV's and private trailer accommodation, but in these cases the upper volume is in the form of an open plan living area, and the problems associated with partitioning do not arise.

Another shortcoming of existing bunkhouse trailers is that they are not of a modular construction. Generally, all the living quarters are in the form of a single sub-divided shell, and if maintenance has to be done on one or two of the living units the entire bunkhouse trailer has to be taken out of commission. It also leaves no room for customization, for example where there is the need to convert two adjacent living units into one room of larger surface area.

It is accordingly an object of the invention to provide a mobile accommodation arrangement that will, at least partially, alleviate the above disadvantages.

It is also an object of the invention to provide a mobile accommodation arrangement which will be a useful alternative to existing mobile accommodation arrangements.

SUMMARY OF THE INVENTION

According to the invention there is provided a mobile accommodation arrangement including
- at least one lower living unit in the form of a compartment having a hollow interior;
- an upper shell configured and dimensioned to fit over an outer periphery of the lower living unit, in order for the upper shell to be telescopically displaceable relative to the lower living unit between a stowage position, in which the lower living unit nests inside the upper shell, and a deployed position, in which the upper shell is at least partially vertically spaced apart from the lower living unit in order for the upper shell to define an upper living unit having a hollow interior, the floor of which is defined by a ceiling of the lower living unit; and
- at least one partitioning member for dividing the hollow interior of the upper living unit into at least two separate volumes, wherein the partitioning member is configured to be automatically displaced by the upper shell between partitioning and non-partitioning configurations when the upper shell is displaced between the deployed and stowage positions.

There is provided for the partitioning member to depend downwardly from a roof of the upper shell.

The lower living unit may comprise at least two spaced apart modules with a gap being present between the modules, and the partitioning member may slideably fit inside the gap in order to be vertically displaceable relative to the modules.

The partitioning member may be in the form of a panel that depends perpendicularly from the roof of the upper shell, and which is rigidly secured to the upper shell.

The panel may be a singular rigid panel.

The partitioning member may be in the form of a panel that depends perpendicularly from the roof of the upper shell, and which is pivotably displaceable relative to the upper shell.

The panel may comprise at least two planar sections that are hingedly connected to one another in order for the two sections to be collapsible onto one another when the upper shell is displaced towards the stowage position, wherein the collapsed panel is pivotable to a position in which it is substantially parallel relative to the roof of the upper shell.

There is also provided for a circumferential skirt to extend upwardly from the lower living units in order to define a bottom zone of the upper living units.

At least one bed may be provided in the bottom zone of the upper living units, and are configured not to extend beyond a periphery of the skirt.

At least one closet may depend from the roof of the upper shell, and is configured to fit into the bottom zone of the upper living unit when the upper shell is displaced to the stowage position.

There is provided for the closet to be a fixture that does not have to be removed before the shell is displaced to the stowage position. More particularly, there is provided for the closet to fit inside a complementary space provided adjacent the beds in order for the closet to nest inside the gap when the shell is displaced to the stowage position.

According to a further aspect of the invention there is provided an upper shell, suitable for use in a vertically expandable mobile accommodation arrangement, the upper shell including:
  a roof;
  two opposing sidewalls extending downwardly from a periphery of the roof;
  two opposing end walls extending downwardly from a periphery of the roof;
  and at least one partitioning member extending downwardly from a distal zone of the roof, the partitioning member being substantially parallel to the end walls.

The partitioning member may be in the form of a panel that depends perpendicularly from the roof of the upper shell, and which is rigidly secured to the upper shell.

The panel may be a singular rigid panel.

The partitioning member may be in the form of a panel that depends perpendicularly from the roof of the upper shell, and which is pivotably displaceable relative to the upper shell.

The panel may comprise at least two planar sections that are hingedly connected to one another in order for the two sections to be collapsible onto one another when the upper shell is displaced towards the stowage position, and for the collapsed panel to be pivotable to a position in which it is substantially parallel relative to the roof of the upper shell.

According to the invention there is provided a mobile accommodation arrangement including:
  a plurality of adjacently located modular lower living units in the form of compartments having hollow interiors;
  an upper shell configured and dimensioned to fit over the outer periphery of the lower living units, in order for the upper shell to be telescopically displaceable relative to the lower living units between a stowage position, in which the lower living units nest inside the upper shell, and a deployed position, in which the upper shell is at least partially vertically spaced apart from the lower living units in order for the upper shell to define an upper living unit having a hollow interior, the floor of which is defined by a ceiling of the lower living units; and
  at least one partitioning member for dividing the hollow interior of the upper living unit into at least two separate volumes.

There is provided for the partitioning member to be configured to be automatically displaced between partitioning and non-partitioning configurations when the upper shell is displaced.

According to the invention there is provided a mobile accommodation arrangement including:
  at least one lower living unit in the form of a compartment having a hollow interior;
  an upper shell configured and dimensioned to fit over the outer periphery of the lower living unit, in order for the upper shell to be telescopically displaceable relative to the lower living unit between a stowage position, in which the lower living unit nests inside the upper shell, and a deployed position, in which the upper shell is at least partially vertically spaced apart from the lower living unit in order for the upper shell to define an upper living unit having a hollow interior, the floor of which is defined by a ceiling of the lower living unit; and
  at least one partitioning member for dividing the hollow interior of the upper living unit into at least two separate volumes, wherein the partitioning member is secured to the upper shell in such a way that it allows movement of the partitioning structure in between two flat surfaces, and past or over the lower living units.

In one embodiment the two flat surfaces may be the ceiling of the lower living unit and the roof of the shell.

In another embodiment the two flat surfaces may be the spaced apart walls of the lower living units.

BRIEF DESCRIPTION OF THE DRAWINGS

Preferred embodiments of the invention are described by way of non-limiting examples and with reference to the accompanying drawings in which:

FIG. 2 is a cross-sectional side view of the mobile accommodation arrangement in accordance with one embodiment of the invention, with the upper shell of the mobile accommodation arrangement in a deployed position;

FIG. 3 is a cross-sectional side view of the mobile accommodation arrangement of FIG. 2 with the upper shell of the mobile accommodation arrangement in a stowage position, showing partitioning panels located inside gaps provided between adjacent lower living units;

DETAILED DESCRIPTION OF INVENTION

Figure 1:
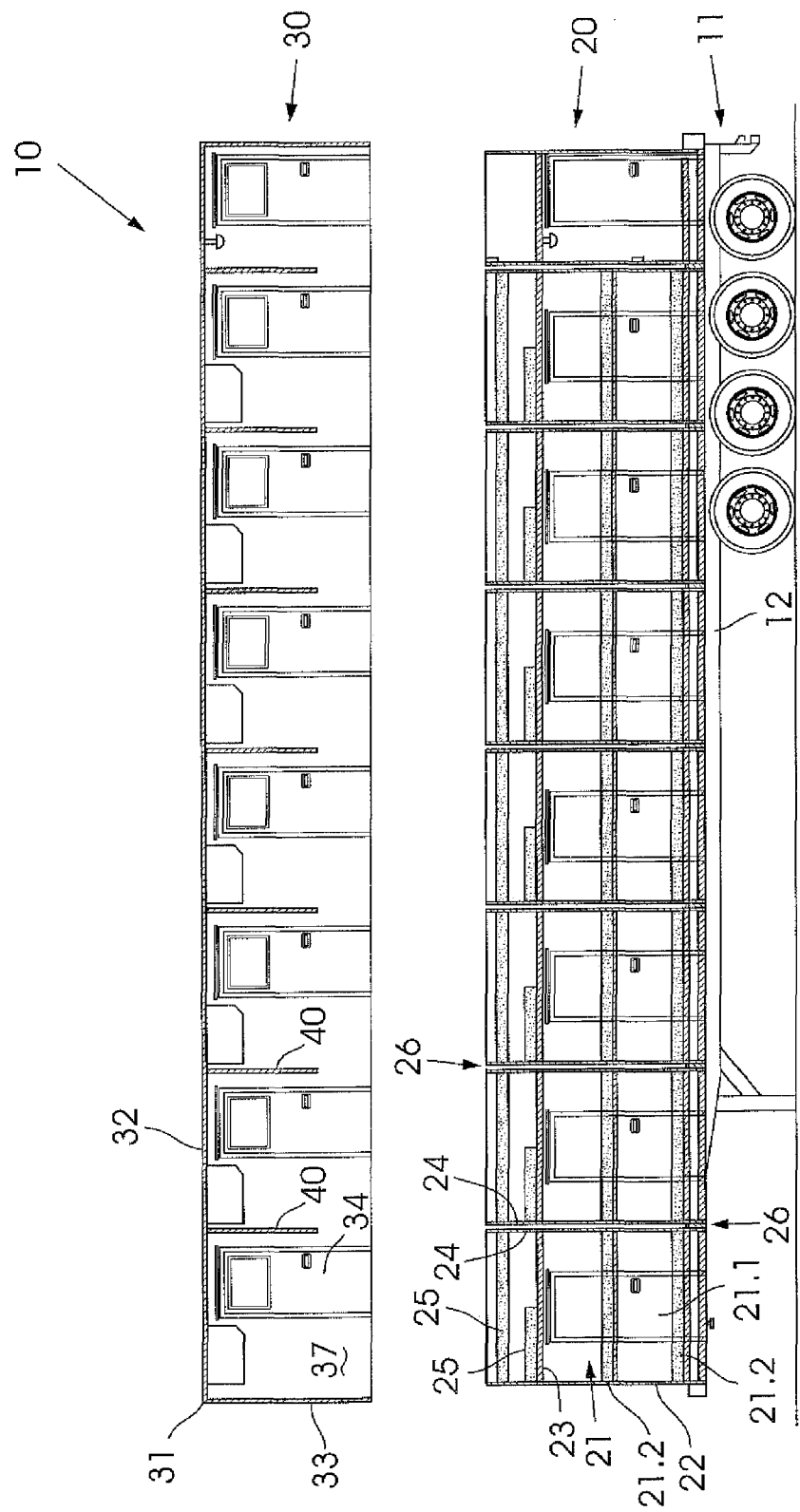
FIG. 1 is an exploded side view of a mobile accommodation arrangement in accordance with one embodiment of the invention, with an upper shell of the mobile accommodation arrangement shown spaced apart from the lower living units of the mobile accommodation arrangement.
Figure 4:
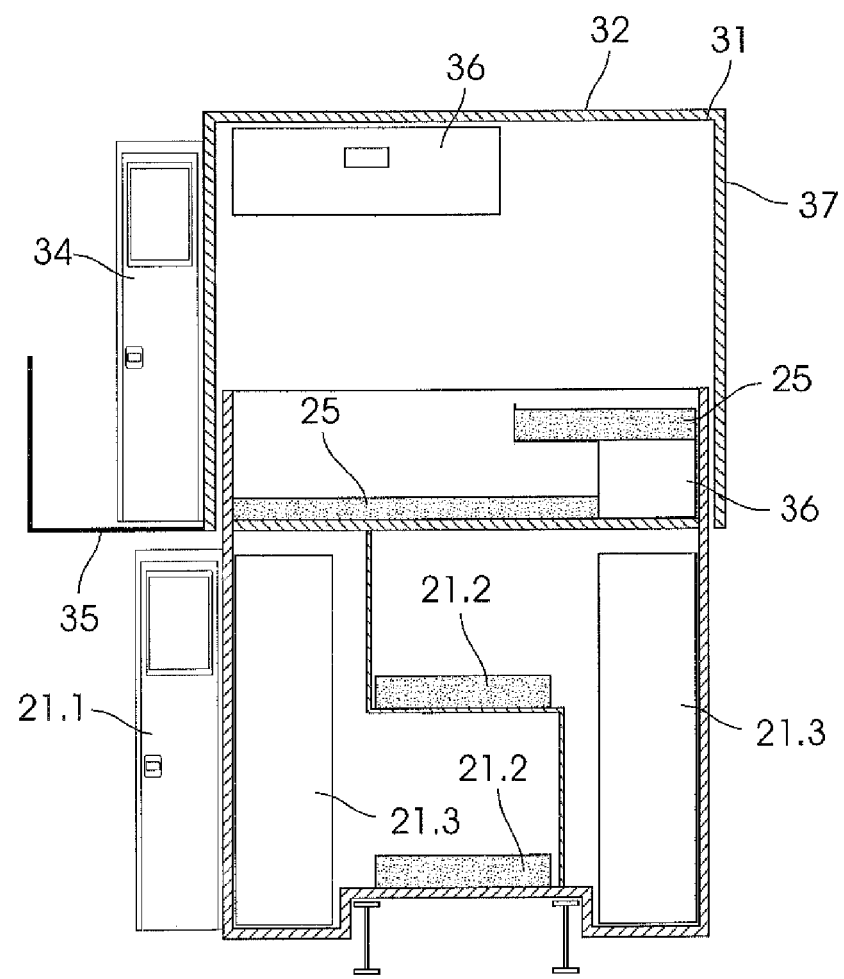
FIG. 4 is a cross-sectional end view of the mobile accommodation arrangement of FIG. 2, with the upper shell of the mobile accommodation arrangement in a deployed position.

Referring to the drawings, in which like numerals indicate like features, a non-limiting example of a mobile accommodation arrangement in accordance with the invention is generally indicated by reference numeral 10. The mobile accommodation arrangement 10 is in the form of a bunkhouse trailer having lower living units 20, and upper living units 30. The bunkhouse trailer can be displaced between a stowage position in which the upper living units 30 are collapsed, and a deployed position in which the upper living units 30 are expanded and suitable for use.

The mobile accommodation arrangement 10 is a multiple occupancy accommodation system that is located on the chassis beams 12 of a trailer 11, and which can therefore be transported to a desired location where accommodation is required.

A plurality of lower living units 20 are located on the bed 12 of the trailer 11. The lower living units 20 are in the form of adjacently located compartments 21 which are separate from one another so as to be of modular configuration in which individual compartments can be removed, for example for the purposes of maintenance. It will be appreciated that the lower living units do not have to be modular, but that the modular configuration is, however, a preferred embodiment. Each compartment includes at least one bed 21.2 and a door 21.1 leading into the compartment, but for the purposes of this specification the internal configuration of the lower living units is of lesser importance, and is therefore not discussed in any detail. Suffice it to say that each lower living unit 20 may comprise a single compartment having one or two beds, or may be divided into a double compartment, each of which has one bed. The inventive concept, however, finds application irrespective of the layout of the lower living unit, and the layout of the lower living units will therefore be determined by the particular user requirements. There is also provided for some of the lower living units to be merged into larger modules, for example should a gym or a laundry be required.

In the modular configuration shown in FIGS. 1 to 4, each modular compartment 21 comprises four sidewalls 22 and a ceiling 23 in order to form an enclosed volume. A door 21.1 is provided in one of the sidewalls 22, and provides access to the compartment. In the example where the compartment is divided into two sub-compartments (not shown) doors will be provided in opposing sidewalls 22. An upstanding circumferential skirt 24 extends from the ceiling 23 of the compartment 21, with the skirt being co-planar with the sidewalls 22. The skirt 24 defines a bottom zone of an upper living compartment 30, as is discussed in more detail below. One or more beds 25 are located in the bottom zone of the upper living compartment 30, with the beds being located below the upper periphery of the skirt 24 for reasons which will become apparent herein below.

Due to the modular nature of the lower living units 20, the compartments 21 can be spaced apart in order to form gaps 26 there between. The gaps 26 can then be utilized for receiving partitioning panels 40 as discussed in more detail below.

One or more upper living units 30 are provided on a second level of the mobile accommodation arrangement 10. These living units 30 are of a collapsible nature, and can be configured to be in a deployed condition (shown in FIG. 2) and a stowage position (shown in FIG. 3). The upper living units are defined by an upper shell 31 which fits over the lower living units 20, and which is displaceable between the stowage position of FIG. 3, in which the lower living units 20 nest inside the shell 31, and the deployed position of FIG. 2, in which the upper shell 31 is telescopically displaced away from the lower living units 30 in order for an enclosed volume to be formed between the inner surface and the shell and the ceiling 23 and skirt 24 of the lower living units 20. As mentioned above, a bottom zone of an upper room is formed by the ceiling 23 of the lower living unit 20, as well as the skirt 24 extending from the ceiling 23, with one or more beds, for example, already provided inside the volume encapsulated by the skirt 24.

The upper shell 30 is in the form of an inverted, rectangular receptacle, and includes a roof 32 from which two end walls 33 and two side walls 37 extend. The side walls 37 and the end walls 33 are continuous. Doors 34 are provided in at least one of the side walls 37 and in use provide individual access to the upper living units. A walkway 35 (seen in FIG. 4) extends along the outer surface of at least one of the side walls 37, with a collapsible stairwell or ladder providing access to the walkway 35. The walkway is displaceable between an operative position in which the walkway is substantially perpendicular relative to the side wall, and a stowage position, in which the walkway is angularly displaced to a position parallel with the sidewall, with the walkway therefore overlying the sidewall. In addition to providing access to the upper living units 30, the walkway also serves a structural function in that it acts as a reinforcing beam that increase the bending moment of the upper shell as a whole, in particular where the upper shell has been weakened by the removal of doorways. At least one closet 36 depends from the roof 32, and is configured to fit in a gap adjacent the beds 25 located on the ceiling 23 of the lower living unit when the upper shell 30 is displaced to the stowage position.

The upper shell 31 can be displaced relative to the lower living units 20 by way of any suitable displacement or actuating mechanism. In a preferred embodiment a piston and cylinder assembly 50 will be provided at each end of the mobile accommodation arrangement 10, but many other mechanisms and configuration of parts will suffice for the purposes of rendering the upper shell 31 selectively displaceable relative to the lower living units 20.

An important aspect of this invention is to provide partitioning that forms an integral part of the mobile accommodation arrangement 10, and which does not have to be installed as separate structures once the upper shell 31 has been displaced to the deployed condition. In particular, partitioning structures are provided which are automatically erected when the upper shell 31 is displaced from the stowage position to the deployed position, and which is also automatically dismantled when the upper shell is displaced from the deployed position to the stowage position. In this way the partitioning structures are displaced by the shell between partitioning (FIGS. 2 and 5) and non-partitioning (FIGS. 3 and 6) configurations.

In one embodiment, shown in FIGS. 1 to 3, the partitioning structures are in the form of partitioning panels 40 that depend from the roof 32 of the upper shell 31. It should, however, be noted that the partitioning structures may also be secured to the sidewalls and not the roof, with free ends of the partitioning panels which are secured in this manner terminating adjacent the roof without actually being secured to the roof. The panels 40 may be stationary relative to the roof 32, but may also be pivotably connected to the roof 32. The panels 40 are configured and orientated to fit inside the gaps 26 provided between adjacent modular compartments 21, which therefore allows the panels to slide up and down into the gaps 26 when the upper shell 31 is erected and dismantled. It follows that the space defined by the internal volume of the upper shell 31 is automatically divided into separate, partitioned rooms when the upper shell 31 is displaced from the stowage position to the deployed position, without the need of manually installing partitioning structures after the fact.

Figure 5:
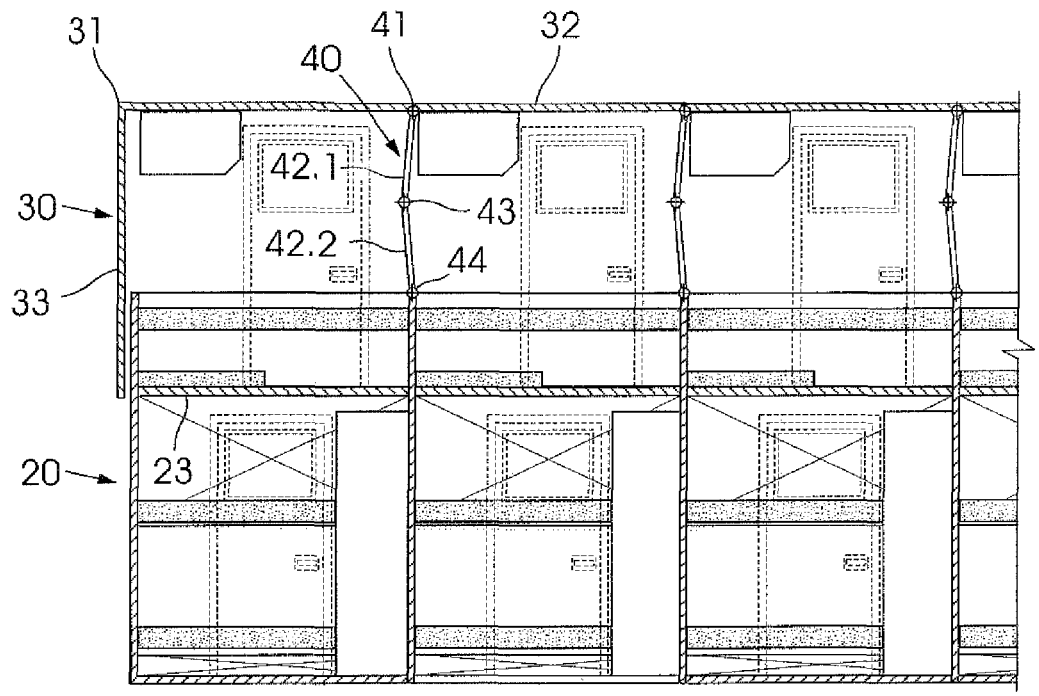
FIG. 5 is a cross-sectional side view of a further embodiment of the mobile accommodation arrangement in accordance with the invention, with the upper shell of the mobile accommodation arrangement in a deployed position.
Figure 6:
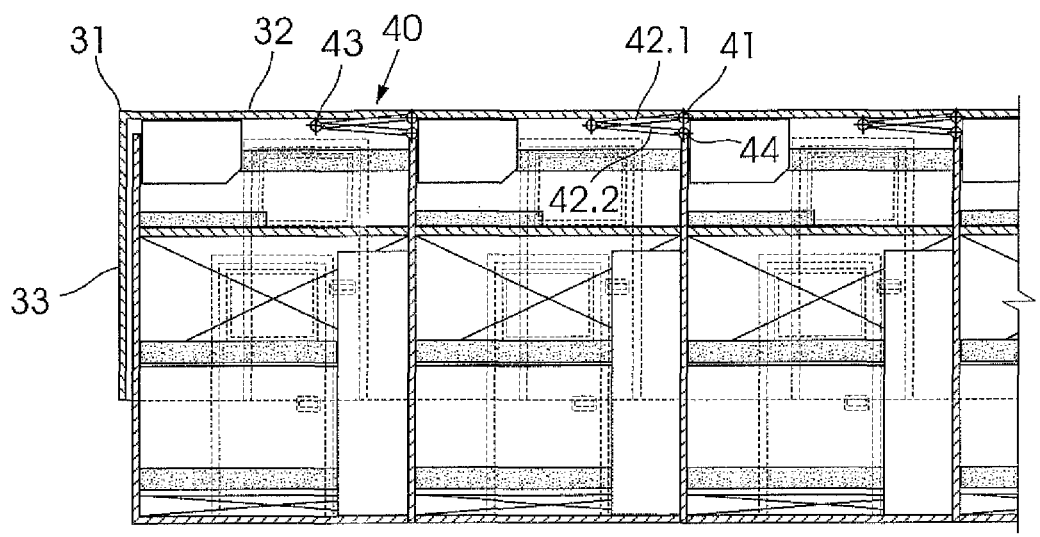
FIG. 6 is a cross-sectional side view of the mobile accommodation arrangement of FIG. 5 with the upper shell of the mobile accommodation arrangement in a stowage position.

In another embodiment, shown in FIGS. 5 and 6, a partitioning structure is provided that does not rely on the provision of the gaps 26 between the modular compartments 21, but which still result in a configuration where the erection and dismantling of the partitioning structures is an automatic and integrated process. In the case the partitioning panel 40 comprises two panels (an upper panel 42.1 and a lower panel 42.2) which are hingedly connected by way of a hinge 43 (or any other connection that will allow the panels to be angularly displaceable) and which can therefore be displaced between an expanded position, in which the two panels (42.1 and 42.2) form one composite panel, and a collapsed position in which the two panels overlie one another. In this embodiment the upper panel 42.1 is pivotably connected to the roof 32 of the upper shell 31, and the lower panel 42.2 is pivotably connected to an extremity 44 of the skirt 24 extending from the lower living units 20. When the upper shell 31 is displaced from the stowage position to the deployed position, the shell 31 will pull the first panel 42.1 upward, and the overlying panels will be expanded to the expanded position in which they form a composite, planar wall. When the upper shell 31 is displaced from the deployed position to the stowage position, the partitioning panel 40 will automatically be displaced to the collapsed position. This embodiment therefore also provides a configuration where the space defined by the internal volume of the upper shell 31 is automatically divided into separate, partitioned rooms when the upper shell 31 is displaced from the stowage position to the deployed position, without the need of manually installing partitioning structures after the fact. An advantage of this second embodiment is that the lower living units 20 do not have to be of a modular spaced apart nature, although it has to be said that the modularity of the lower living units is an advantage in its own right.

When the upper shell 31 is displaced from the deployed position to the stowage position, the partitioning structure is essentially displaced between two flat surfaces. In the embodiment of FIGS. 1 to 4 the flat surfaces are the ceiling 23 of the lower living unit and the roof 32 of the shell. In the embodiment of FIGS. 5 and 6 the flat surfaces are the adjacent but spaced apart sidewalls 24 of the lower living units.

It will be appreciated that the above is only one embodiment of the invention and that there may be many variations without departing from the spirit and/or the scope of the invention.

The invention claimed is:

1. A mobile accommodation arrangement comprising:
a lower living unit comprising at least two spaced apart modules with a gap provided between the modules, each module being in the form of a compartment having a hollow interior;
an upper shell configured and dimensioned to fit over an outer periphery of the lower living unit, in order for the upper shell to be telescopically displaceable relative to the lower living unit between a stowage position, in which the lower living unit nests inside the upper shell, and a deployed position, in which the upper shell is at least partially vertically spaced apart from the lower living unit in order for the upper shell to define an upper living unit having a hollow interior, a floor of which is defined by a ceiling of the lower living unit; and
at least one partitioning member for dividing the hollow interior of the upper living unit into at least two separate volumes, wherein the partitioning member is configured to be displaced by the upper shell between partitioning and non-partitioning configurations when the upper shell is displaced between the deployed and stowage positions; wherein the partitioning member slideably fits inside the gap provided between the modules in order to be vertically displaceable relative to the modules.

2. The mobile accommodation arrangement of claim 1 wherein the partitioning member depends downwardly from a roof of the upper shell.

3. The mobile accommodation arrangement of claim 1 wherein the partitioning member is in the form of a panel that depends perpendicularly from the roof of the upper shell, and which is rigidly secured to the upper shell.

4. The mobile accommodation arrangement of claim 1 wherein a circumferential skirt extends upwardly from each module in order to define a bottom zone of the upper living unit.

5. The mobile accommodation arrangement of claim 4 wherein at least one bed is provided in the bottom zone of the upper living unit, with the bed being configured not to extend beyond a periphery of the skirt.

6. The mobile accommodation arrangement of claim 5 wherein at least one closet depends from the roof of the upper shell, and is configured to fit into the bottom zone of the upper living unit when the upper shell is displaced to the stowage position.

7. The mobile accommodation arrangement of claim 6 wherein there is provided for the closet to fit inside a complementary space provided adjacent the beds in order for the closet to nest inside the complementary space when the shell is displaced to the stowage position.

\* \* \* \* \*